(12) United States Patent
Alessandrini

(10) Patent No.: US 9,194,605 B2
(45) Date of Patent: Nov. 24, 2015

(54) HEAT EXCHANGER

(75) Inventor: Alberto Alessandrini, Meldola (IT)

(73) Assignee: COSMOGAS S.r.l., Meldola (FC) (IT)

( * ) Notice: Subject to any disclaimer, the term of this patent is extended or adjusted under 35 U.S.C. 154(b) by 15 days.

(21) Appl. No.: 13/636,787

(22) PCT Filed: Mar. 21, 2011

(86) PCT No.: PCT/IB2011/051169
§ 371 (c)(1),
(2), (4) Date: Sep. 24, 2012

(87) PCT Pub. No.: WO2011/117802
PCT Pub. Date: Sep. 29, 2011

(65) Prior Publication Data
US 2013/0008635 A1      Jan. 10, 2013

(30) Foreign Application Priority Data

Mar. 22, 2010   (IT) .............................. TO2010A0222

(51) Int. Cl.
*F28D 7/02*       (2006.01)
*F24H 1/43*       (2006.01)
(Continued)

(52) U.S. Cl.
CPC .. *F24H 9/02* (2013.01); *F24H 1/43* (2013.01); *F24H 9/142* (2013.01); *F24H 9/146* (2013.01); *F24H 9/148* (2013.01); *F24D 2220/06* (2013.01)

(58) Field of Classification Search
CPC ........... F28D 7/024; F28D 7/026; F28D 7/04; F28D 7/103; F28D 7/106; F28D 1/0472; F28D 1/0473; F24H 9/02; F24H 9/148; F24H 9/142; F24H 9/146; F24H 1/43; F24H 8/00; F24D 2220/06

USPC ............................ 165/74, 145, 157, 163, 178
See application file for complete search history.

(56) References Cited

U.S. PATENT DOCUMENTS 1,825,433 A * 9/1931 White .............................. 165/72
1,840,940 A * 1/1932 Ecabert .......................... 165/161
(Continued)

FOREIGN PATENT DOCUMENTS

EP       1 813 882 A1     8/2007
EP       1813882 A1  *   8/2007
(Continued)

OTHER PUBLICATIONS

Communication Pursuant to Article 94(3) EPC in EP Application No. 11730432.9, dated Sep. 7, 2014, 3 pages.
(Continued)

*Primary Examiner* — Tho V Duong
(74) *Attorney, Agent, or Firm* — Heslin Rothenberg Farley & Mesiti P.C.; Victor A. Cardona, Esq.

(57) ABSTRACT

A heat exchanger has an exchanger unit, including at least one first coiled conduit and one second coiled conduit that are substantially coaxial, and a casing for housing the exchanger unit. The casing has a first end wall, a second end wall, and a peripheral part between the two end walls. Each conduit has an inlet and an outlet, where the outlet of the first conduit is connected substantially in series to the inlet of the second conduit. The exchanger unit is supported by the first end wall of the casing, with the inlet of the first conduit and the outlet of the second conduit which are substantially at the first end wall of the casing.

20 Claims, 12 Drawing Sheets

(51) Int. Cl.
*F24H 9/02* (2006.01)
*F24H 9/14* (2006.01)

(56) References Cited

U.S. PATENT DOCUMENTS

| | | | | |
|---|---|---|---|---|
| 2,523,990 | A | * | 9/1950 | Graham ........................ 165/163 |
| 2,566,976 | A | * | 9/1951 | Bernstrom ...................... 165/75 |
| 2,735,410 | A | * | 2/1956 | Armbrust et al. ........... 122/448.4 |
| 3,282,257 | A | * | 11/1966 | McInerney et al. ....... 122/250 R |
| 3,359,949 | A | * | 12/1967 | Bjarnason et al. ............. 122/248 |
| 4,124,064 | A | * | 11/1978 | Jabsen et al. ................... 165/69 |
| 4,306,618 | A | * | 12/1981 | Honkajarvi ................... 165/163 |
| 4,502,626 | A | * | 3/1985 | Gerstmann et al. .......... 122/44.2 |
| 4,621,592 | A | * | 11/1986 | McInerney ................ 122/250 R |
| 4,966,695 | A | * | 10/1990 | Joshua ........................ 210/198.2 |
| 5,325,684 | A | * | 7/1994 | Stierlin et al. .................. 62/487 |
| 5,682,947 | A | * | 11/1997 | McFarlane .................... 165/163 |
| 6,052,898 | A | * | 4/2000 | Corrigan .................. 29/890.037 |
| 2007/0000653 | A1 | * | 1/2007 | Alessandrini et al. ........ 165/163 |

FOREIGN PATENT DOCUMENTS

| | | | |
|---|---|---|---|
| EP | 2505932 | A1 * | 10/2012 |
| GB | 560 910 | A | 4/1944 |
| WO | 2005/080900 | A2 | 9/2005 |

OTHER PUBLICATIONS

International Search Report for International Application No. PCT/IB2011/051169, dated Sep. 26, 2011.

* cited by examiner

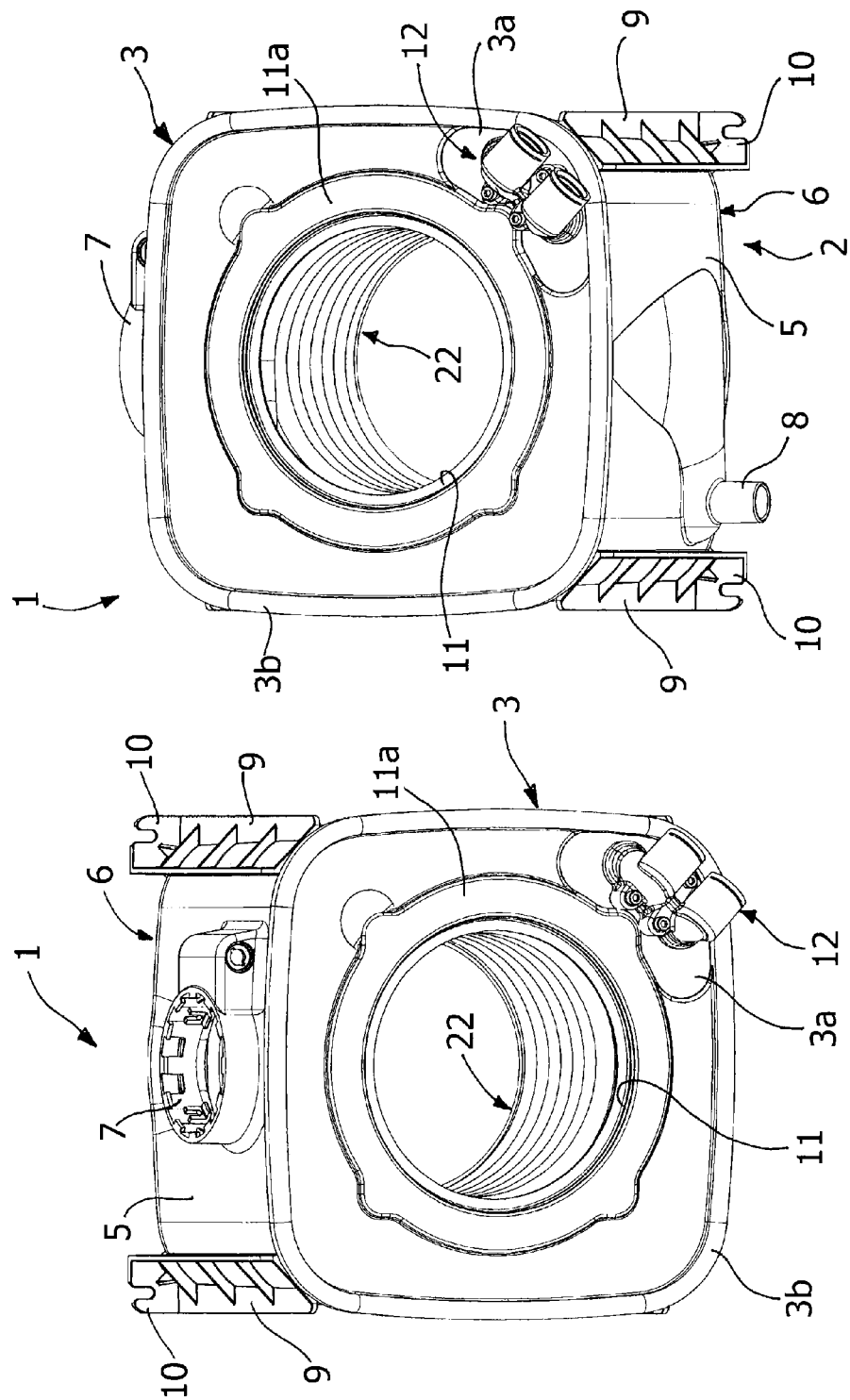

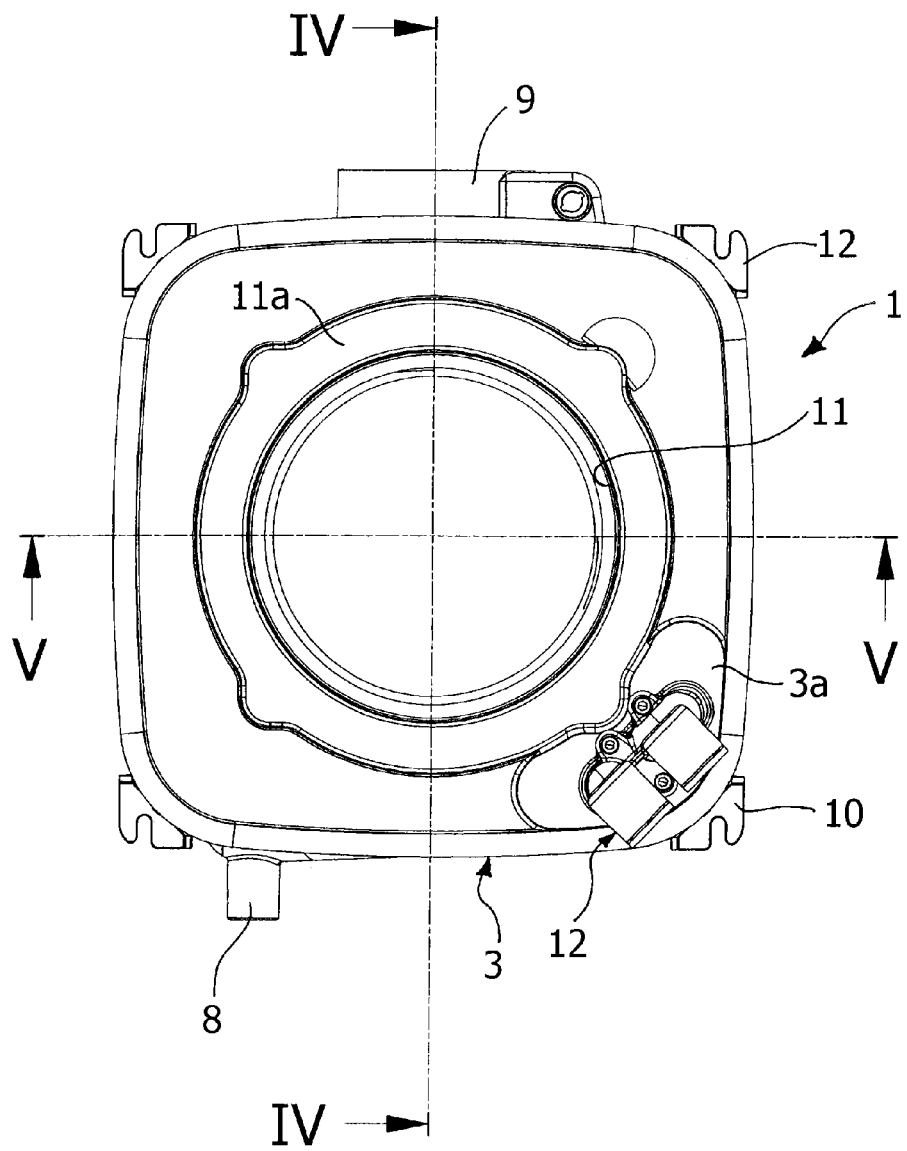

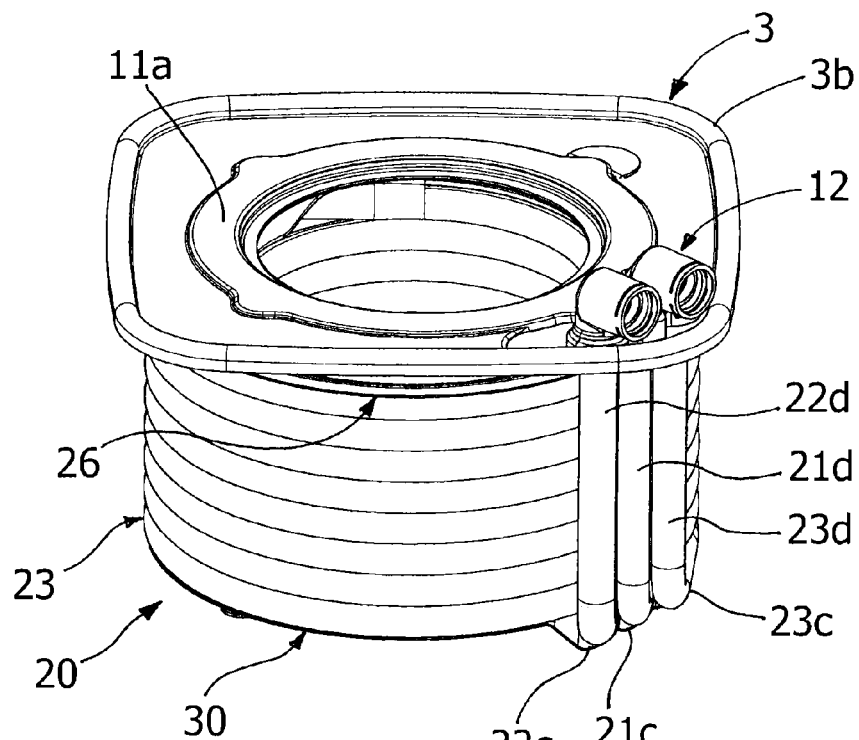
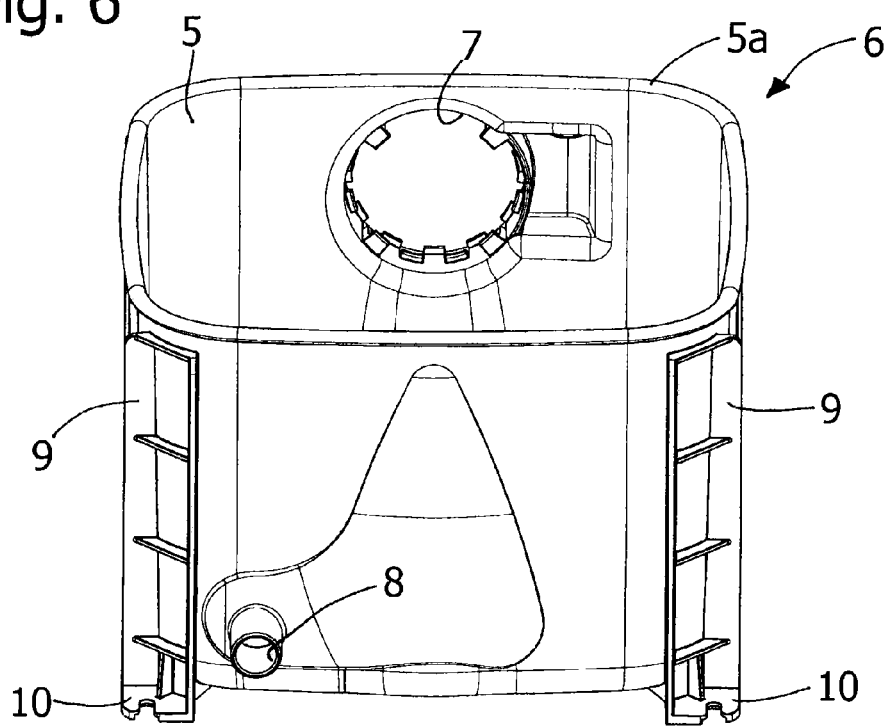
Fig. 6

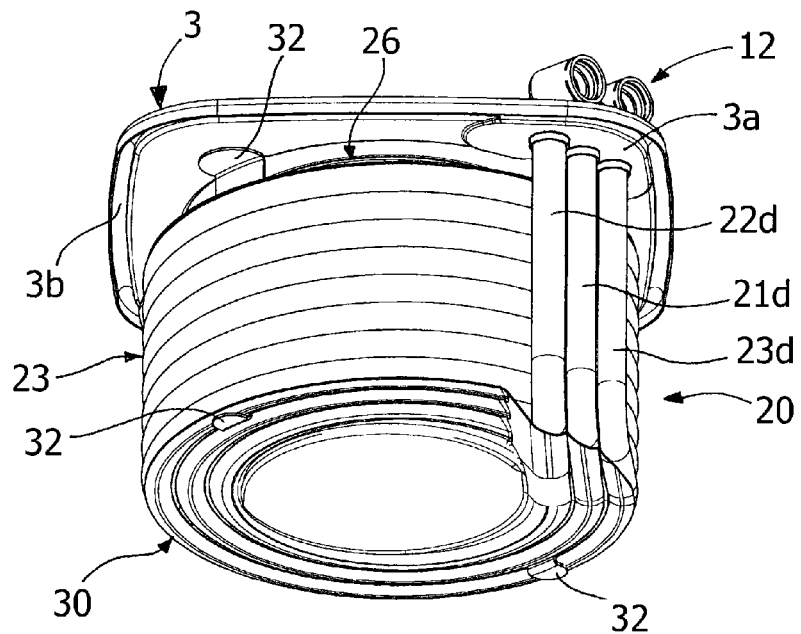
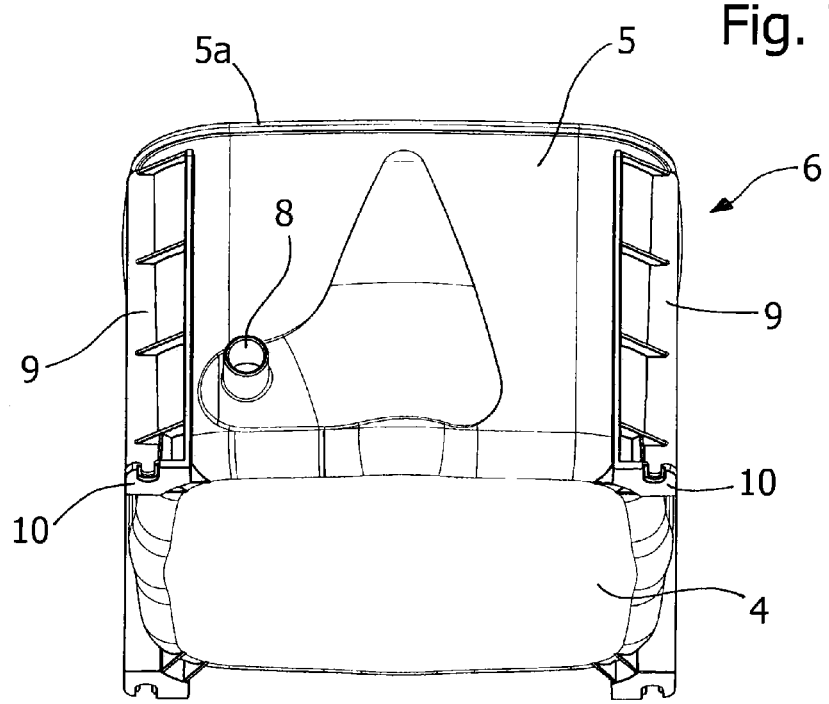
Fig. 7

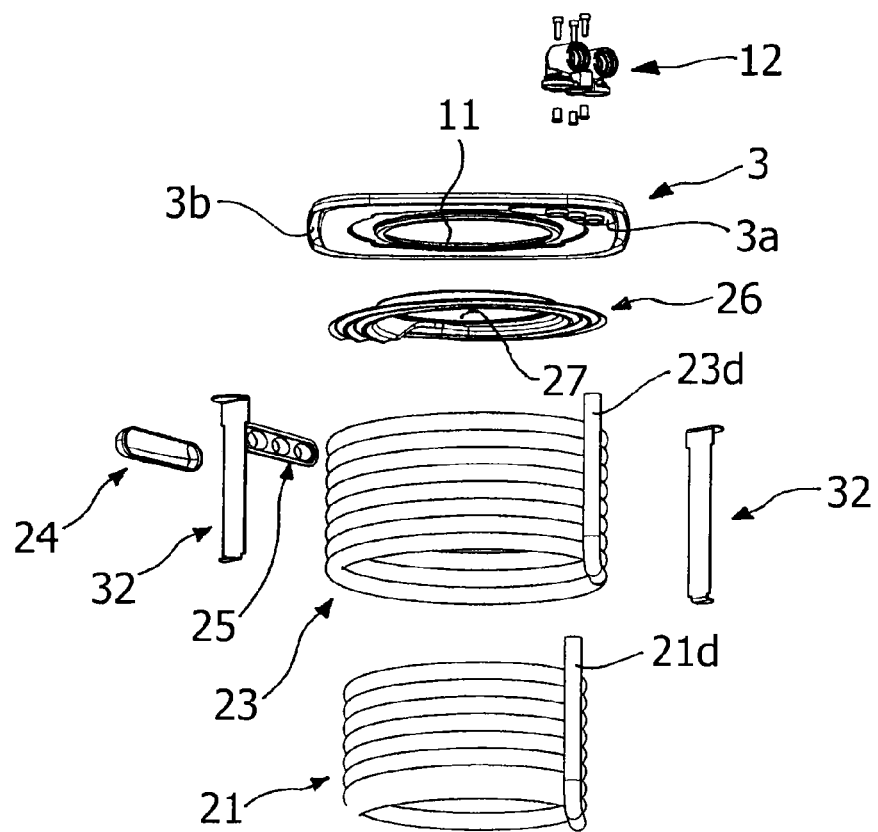
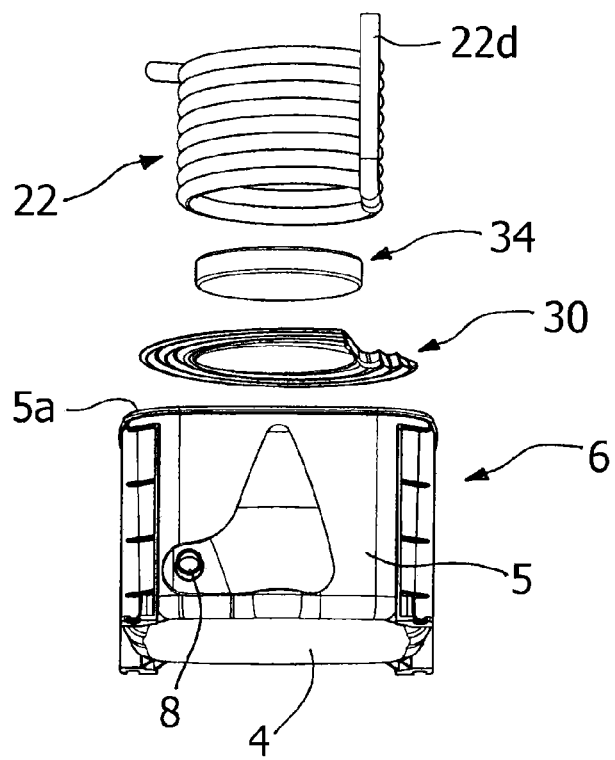
Fig. 9

HEAT EXCHANGER

CROSS REFERENCE TO RELATED APPLICATIONS

This application is a national stage filing under section 371 of International Application No. PCT/IB2011/051169, filed on Mar. 21, 2011, and published in English on Sep. 29, 2011, as WO 2011/117802 and claims the priority of Italian application No. TO2010A000222 filed on Mar. 22, 2010, the entire disclosure of these applications being hereby incorporated herein by reference.

FIELD OF THE INVENTION

The present invention relates to a heat exchanger, in particular of the condensation type.

PRIOR ART

The function of a heat exchanger is that of transferring thermal energy between two fluids: for example, in the case of domestic gas boilers, the function of the heat exchanger is to heat water that circulates inside it, starting from the hot fumes that result from the combustion produced via a burner. Said boilers are conceived for exploiting both the heat that develops following upon combustion and the latent heat of condensation, contained in the combustion fumes. In order to recover the heat contained in the fumes the heat exchanger comprises a casing defined in which is a path of circulation of the water, against which the fumes are made to flow.

The amount of heat of condensation that is recovered mainly depends upon the temperature of delivery and return of the water from/to the heat exchanger. Furthermore, to obtain a considerable exchange between the fluids inside and outside the path of the heat exchanger, it is necessary to have a heat-exchange surface that is as extensive as possible. For this purpose, the aforesaid path can include a plurality of coiled conduits or tubes, arranged substantially coaxial to one another, the innermost conduit of the plurality surrounding the burner.

In a first type of solutions the coiled conduits operate in parallel; i.e., they each extend between an inlet chamber and an outlet chamber of the heat exchanger, which are formed at the two axial ends of the corresponding casing. A solution of this type is known from the document No. WO 2005/080900.

In a second type of solutions—to which the present invention refers—a number of coiled conduits are connected in series, via substantially U-shaped connectors, so that the water penetrates into the heat exchanger from the inlet of the first conduit of the series and comes out of the heat exchanger through the outlet of the last conduit of the series. A solution of this type is known from the document No. EP-A-1 813 882, on which the preamble of Claim 1 is based.

In known heat exchangers with arrangement in series of the coiled conduits the helices formed by the various coiled conduits are "packed" between two opposite end walls of the casing. This entails the need to envisage significant masses of thermal insulators at the aforesaid end walls. This type of solution is moreover far from flexible from the production standpoint given that the axial dimensions of the casing of the heat exchanger are determined by the axial dimensions of the coiled conduits. As has been said, the thermal power of a heat exchanger depends, among other things, upon the heat-exchange surface, so that—but for further complications of production and cost—heat exchangers conceived for different thermal powers differ from one another as regards the number of the turns of the various conduits, and hence for as regards the axial dimension of the corresponding helices: it will be understood that, since said helices are packed between the two end walls of the casing, the latter must be built purposely for each model of heat exchanger, at least as regards the dimension of its peripheral part, in which also the fume outlet and the inlet and outlet connectors for the water are usually defined.

These known solutions then present the further drawback that the testing step can practically take place only when the heat exchanger has been practically completely assembled, namely with the set of coiled conduits mounted within the casing. In the case of production defects (for example, leakages of liquid owing to non-perfect welds or seals), the product must be at least in part dismantled, with the times and costs that this involves.

In general terms, moreover, the structure of known heat exchangers with arrangement in series of a number of coiled conduits is far from flexible also from the standpoint of the possibility of installation in user apparatuses, such as boilers or water heaters, for example on account of the positioning of the water inlet and outlet connectors.

SUMMARY OF THE INVENTION

In the light of the previous considerations, the present invention aims to solve one or more of the indicated drawbacks and to provide a heat exchanger that has an efficient operation and compact dimensions, that is simple and economically advantageous to produce and to test and that is distinguished by a high flexibility both in terms of production and in terms of installation. With a view to achieving the aim, the subject of the invention is a heat exchanger, in particular of the condensation type, having the characteristics indicated in the attached claims, which form an integral part of the technical teaching provided herein in relation to the invention.

BRIEF DESCRIPTION OF THE DRAWINGS

Further purposes, characteristics, and advantages of the invention will emerge from the ensuing description with reference to the annexed drawings, which are provided purely by way of non-limiting example and in which:

FIGS. 1 and 2 are perspective views of a heat exchanger according to the invention;

FIG. 3 is a front view of the heat exchanger of FIGS. 1 and 2;

FIGS. 6 and 7 are partially exploded views, from different angles, of the heat exchanger of FIGS. 1 and 2;

FIGS. 8 and 9 are exploded views, from different angles, of the heat exchanger of FIGS. 1 and 2, at a reduced scale;

DESCRIPTION OF PREFERRED EMBODIMENTS OF THE INVENTION

Figure 4:
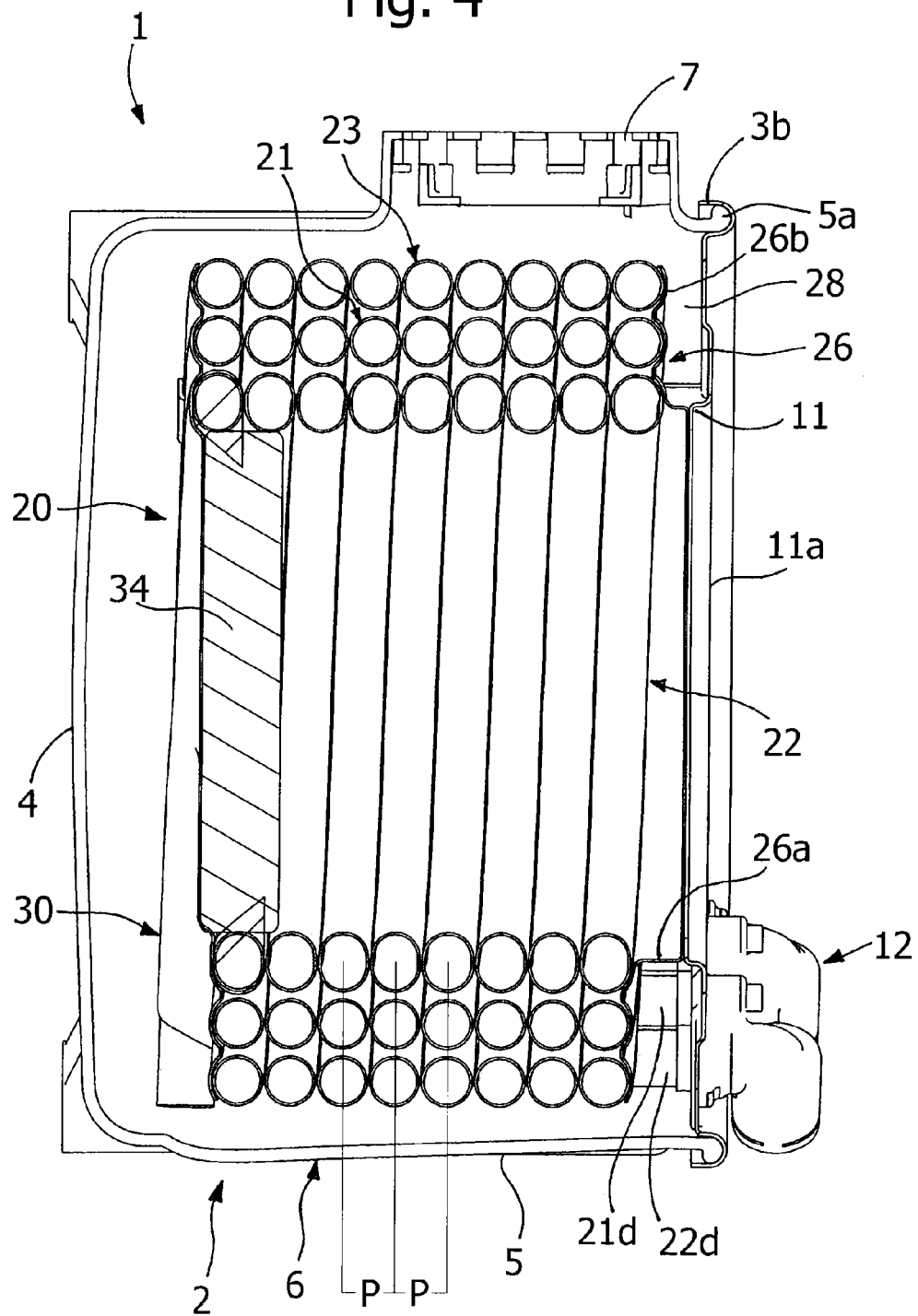
FIGS. 4 and 5 are sections according to the lines IV-IV and V-V of FIG. 3, at an enlarged scale.

The reference to "an embodiment" or "one embodiment" in this description is intended to indicate that a particular configuration, structure, or characteristic described in relation to the embodiment is comprised in at least one embodiment. Hence, phrases such as "in an embodiment" or "in one embodiment" and the like that may be present in different points of this description do not necessarily all refer to one and the same embodiment. Furthermore, the particular configurations, structures, or characteristics can be combined in any adequate way in one or more embodiments. The references used herein are merely for convenience and do not define the sphere of protection or the scope of the embodiments.

Designated as a whole by 1 in the figures is a heat exchanger, in particular of the condensation type, for a gas boiler built according to the present invention.

The heat exchanger 1 comprises a casing 2 having two end walls 3 and 4, herein defined as front and rear, and a peripheral part 5, which extends between the two walls 3 and 4. In the example represented, the walls 3 and 4 are substantially quadrangular, and the peripheral part 5 has four side walls orthogonal to one another; in a possible variant (not represented), the end walls have a circular shape, and the peripheral part is constituted by a single cylindrical wall.

In a preferred embodiment, the rear wall 4 and the peripheral part 5 are made of a single body, designated by 6. Said single body 6 is preferentially formed with a mouldable plastic or synthetic material, such as for example polypropylene. Advantageously, the wall 3 can be coupled via calking to the top edge of the peripheral part 5 of the body 6, as will emerge hereinafter.

Defined in the peripheral part 5, preferably but not necessarily in opposite regions thereof, are a fume outlet 7 and a condensate outlet 8, which are substantially radial with respect to the axis of the casing 2. Obviously, the position of the outlets 7 and/or 8 can be different from the one exemplified. Preferably, the single body 6 integrates also ribbings or stiffening formations 9, for example at the edges of the part 5, as well as an anchoring flange 10.

The wall 3 is made of thermally conductive material, preferably stainless steel, obtained from the deformation of a metal sheet, via operations of shearing and deformation. The wall 3 has a central passage 11, slightly drawn towards the inside, in particular for installation of a burner (see, for example, FIGS. 16 and 17, in which a burner is designated by 50). Preferentially, a stiffening drawing 11a is provided that surrounds the opening 11, in order to prevent deformations following upon installation of the burner. The drawing 11a can support fixing pins of the burner.

Fixed on the outside of the wall 3, in a position that is peripheral with respect to the passage 11, is a hydraulic connecting member 12 of the heat exchanger 1, for a fluid that herein is assumed to be a liquid to be heated, particularly water. Preferentially, the member 12 is fixed in the proximity of a corner of the wall 3.

As will emerge clearly hereinafter, the member 12 has two internal conduits and operates both as inlet connector and as outlet connector for the liquid. In what follows it will also emerge clearly how, advantageously, the inlet and the outlet for the liquid of the heat exchanger 1 are both positioned on one and the same end wall, i.e., the wall 3, preferably but not necessarily in positions close to one another.

Figure 10:
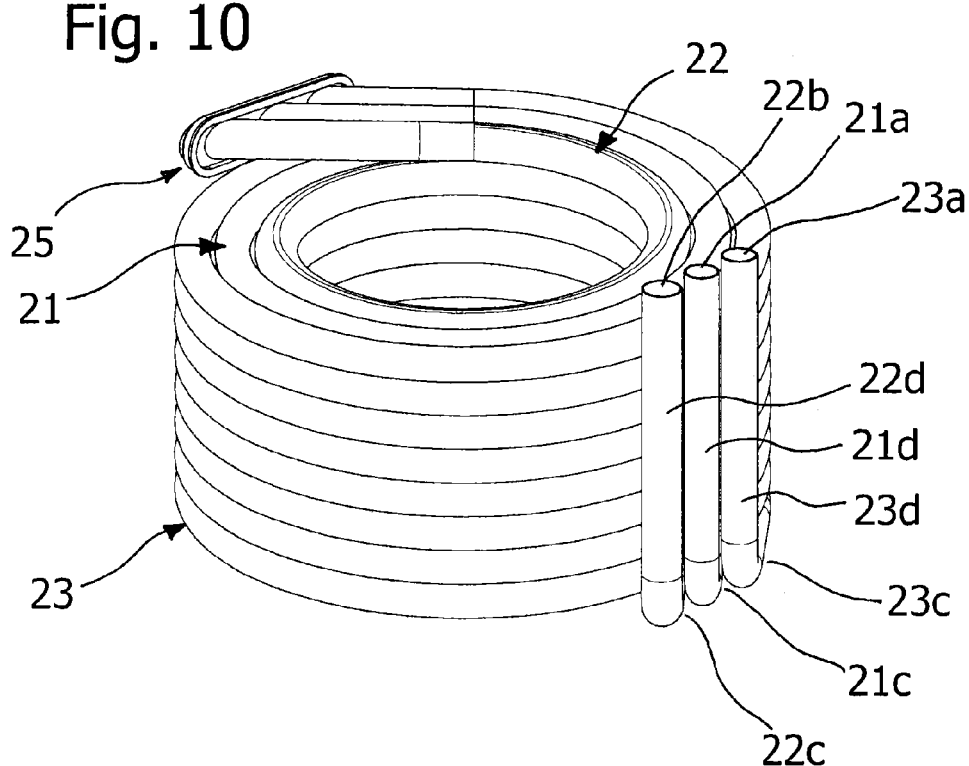
FIGS. 10 and 11 are perspective views, from different angles, of a set of coiled conduits of the heat exchanger of FIGS. 1 and 2.
Figure 11:
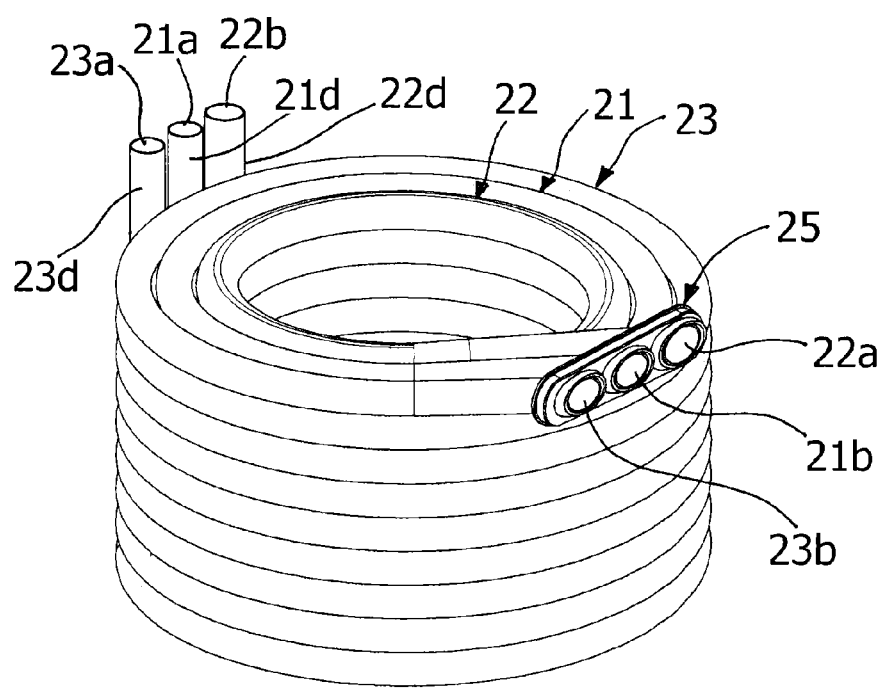
Figure 12:
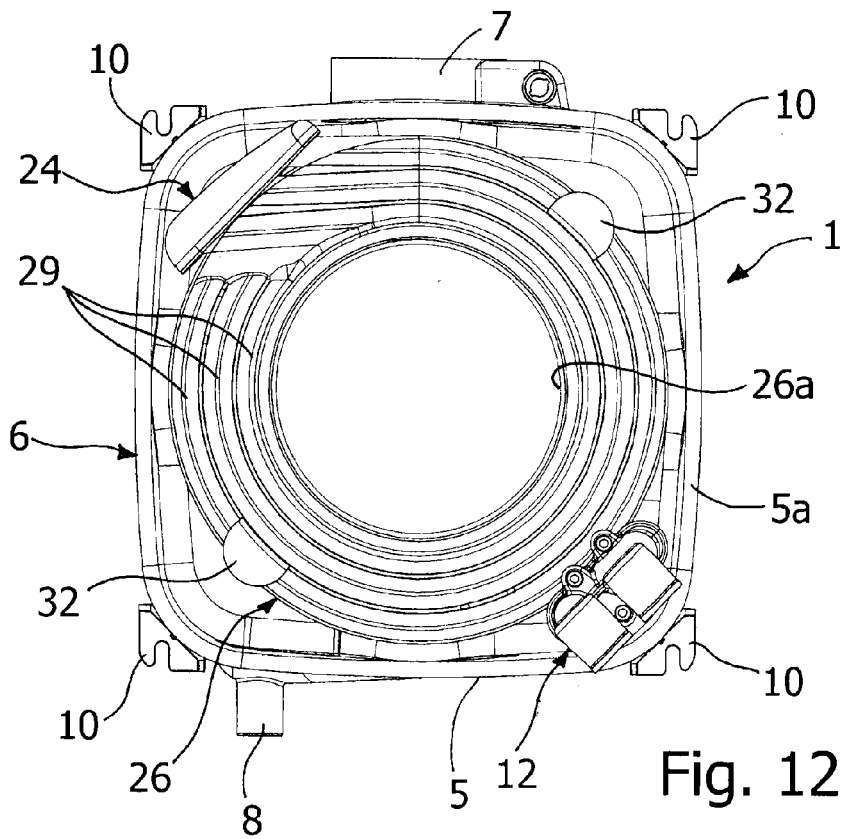
FIGS. 12 and 13 are a front view and a rear view of the heat exchanger of FIGS. 1 and 2, with a front wall removed and a casing body removed, respectively.

The casing 2 houses an exchanger unit, comprising a plurality of coiled conduits, that are substantially coaxial and define a heat-exchange path for the liquid. The aforesaid exchanger unit, which is designated as a whole by 20 in FIGS. 4-7, comprises at least a first and a second coiled metal tube or conduit, designated by 21 and 22, for example in FIGS. 4, 5 and 8, 9. The conduits 21 and 22, which are for example made of steel, have coils of different diameter, where the conduit 22 forms a helix that extends within the helix formed by the conduit 21, as may be clearly seen in FIGS. 4 and 5. In a preferred embodiment of the invention, the unit 20 also includes at least one third coiled metal conduit or tube, designated by 23. In the example represented the conduit 23, for instance made of steel, has turns of a diameter larger than the turns of the conduit 21 so as to form a helix within which the helix formed by the conduit 21 extends. Each conduit 21-23 of the plurality has an inlet 21a, 22a, 23a and an outlet 21b, 22b and 23b (FIGS. 10 and 11).

In a preferred embodiment, not represented, only two conduits are provided, such as the conduits 21 and 22, which have substantially the same flow section and are connected in series to each other, for instance by means of a "U"-shaped connection member or the like, i.e. the outlet 21b of the conduit 21 is connected to the inlet 22a of the conduit 22.

In the preferred embodiment of the invention, in which there are provided the three conduits 21-23, the conduits 21 and 23 are set in parallel to one another and in series to the conduit 22; i.e., the outlets 21b and 23b of the conduits 21 and 23 are connected to the inlet 22a of the conduit 22. This connection of the two outermost conduits 21 and 23 to the internal conduit 22 is made via a manifold member, described hereinafter. In the above said preferred embodiment of the invention including the three conduits, the flow section or section of passage of the conduit 22 is larger than the flow section of the conduit 21 and larger than the flow section of the conduit 23, which preferably—but not necessarily—have the same flow section. In other embodiments, the three conduits 21, 22 and 23 can possibly have the same diameter or flow section, even though said embodiment presents a slightly lower level of performance.

In condensation heat exchangers of the type with a number of coaxial helices, the preponderant part of the heat generated through a burner (approximately 80%) is yielded to the conduit defining the innermost helix. The solution proposed, with internal conduit 22 of larger diameter fed by two conduits in parallel 21 and 23 of smaller diameter enables a high efficiency to be achieved, as well as guaranteeing an adequate flow rate of fluid and keeping the dimensions of the unit 20, and hence of the heat exchanger 1, as a whole compact.

Practical tests conducted by the present applicant have made it possible to ascertain that—in the case of applications of the heat exchanger 1 to boilers for domestic use—it is possible to obtain very efficient operation with conduits 21 and 23 having a flow section corresponding to a diameter comprised between approximately 12 mm and approximately 20 mm, particularly approximately 16 mm, and with a conduit 22 having a flow section corresponding to a diameter comprised between approximately 14 mm and approximately 22 mm, particularly approximately 16 mm.

In a particularly advantageous embodiment, the three conduits 21-23 have, in cross section, a shape such that the respective helices have substantially the same pitch. This solution is particularly advantageous for production purposes, for the reasons that will be explained hereinafter.

Figure 5:
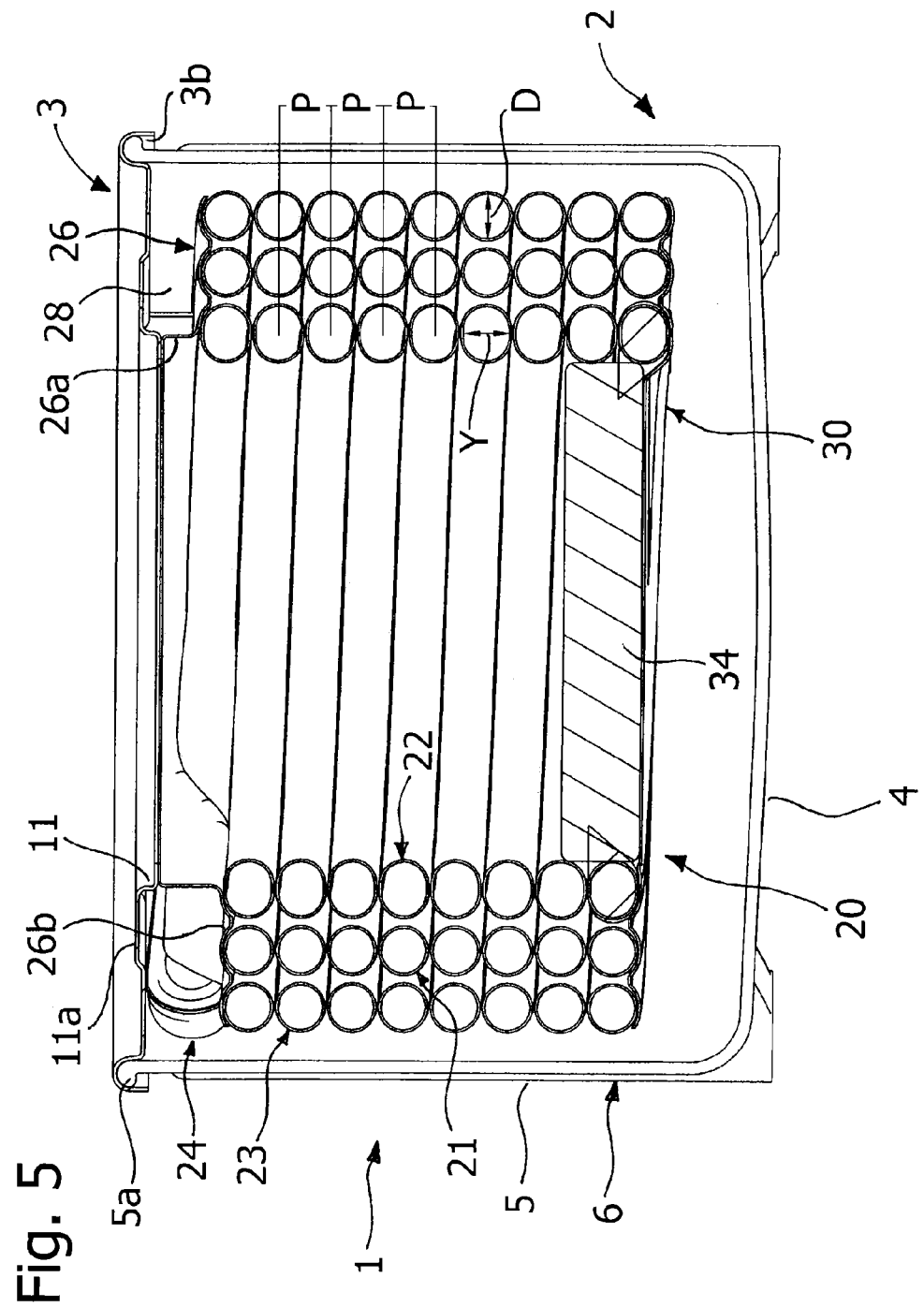

As may be seen for example in FIGS. 4 and 5, in the embodiment exemplified, the conduits 21 and 23 have a roughly circular cross section, whilst the conduit 22 has a roughly ovalized or flattened cross section. As may be noted in FIG. 5, the ovalized section of the conduit 22 has a minor axis Y, generally parallel to the axis of the corresponding helix, which substantially corresponds to the diameter "D" of the circular section of the conduits 21 and 23: in this way, a constant pitch P is obtained for the three helices. Of course, the same result can be obtained with different shapes of cross section of the conduits 21-23. In accordance with one embodiment (not represented), the conduit 22 defining the internal helix of the unit 20 has a substantially round cross section, whilst the conduit 21 or the conduits 21 and 23 have a flow section smaller than that of the conduit 22, generally ovalized or flattened. Hence, in a variant of this sort, the generally ovalized or flattened section of the conduit 21 or of the conduits 21 and 23 has a major axis, generally parallel to the axis of the corresponding helix, which substantially corresponds to the diameter of the circular section of the second conduit 22.

Thanks to the constant pitch P—and as may be noted in FIGS. 4 and 5—the axial dimension of the helices formed by the conduits of the unit 20 is the same (basically, the three helices are of equal height); for the same reasons, also the number of turns of the various helices is the same.

The distance between the turns of each conduit is preferably the same. For this purpose, in one embodiment, each coiled conduit has suitable means for keeping the respective turns at the right distance, which is preferably constant along the development of the helix itself. In a particularly advantageous embodiment, these means are constituted by localized portions of the conduits themselves, shaped to function as spacers. Said localized portions can be obtained via deformation of the corresponding conduit, in particular according to the teachings of the document No. WO 2005/080900.

Once again from FIGS. 4 and 5 it may be noted how, in the heat exchanger 1, the helices formed by two adjacent conduits are set at a distance from one another in such a way that defined between said two conduits is a substantially cylindrical gap. For said purpose, the turns of each helix have preferentially the same diameter. From the same figures it also emerges that the interstices defined between the turns of one helix are set substantially facing or aligned with those of the adjacent helix (i.e., the interstices of one helix do not face the turns of the adjacent helix, such as for example in the aforesaid document No. EP-A-1 813 882). Practical tests conducted by the present applicant have made it possible to ascertain that such an arrangement guarantees in any case an efficient operation of the heat exchanger 1.

According to a characteristic of the invention, the inlet 21a of the conduit 21 and the outlet 22b of the conduit 22—or, as in the exemplified preferred embodiment the inlets 21a, 23a of the conduits 21, 23 and the outlet 22b of the conduit 22—are located substantially at the end wall 3 of the casing 2, as described hereinafter.

For said purpose, in the embodiment exemplified and as may be clearly seen for example in FIGS. 6 and 10, each conduit has an intermediate angled bend, designated by 21c, 22c and 23c. In this way, defined in the conduits 21 and 23—when they are both present—are respective initial stretches of conduit, designated by 21d and 23d, which extend in a generally axial direction or in the direction of height of the corresponding helix; likewise, defined in the conduit 22 is a final stretch of conduit, designated by 22d, which also extends in a generally axial direction or in the direction of height of the corresponding helix.

In a preferred embodiment, the aforesaid stretches of conduit 21d, 22d and 23d (when the latter is provided for) are substantially rectilinear, as well as substantially parallel to one another and parallel to the axis of the helix formed by the respective conduit. Preferably, moreover, the aforesaid stretches of conduit 21d, 22d and 23d (when the latter is provided for) extend on the outside of the helix formed by the outermost conduit 23, and reach substantially one and the same area 3a (see, for example, FIGS. 1 and 2) of the wall 3 of the casing 2, i.e., the area in which the connecting member 12 is mounted. As may be seen, moreover, in the preferred embodiment exemplified, the aforesaid stretches extend from the ends of the helices opposite to the wall 3, as far as the latter.

The connection of the conduit 21, or the conduits 21 and 23, to the conduit 22 is obtained via a manifold member, which is mounted at the inlet end of the conduit 22 and the outlet end of the conduit 21 or the outlet ends of the conduits 21 and 23.

In one embodiment, the aforesaid manifold member comprises a generally cap like body, designated by 24 in FIGS. 5, 8, 9, 12 and 13. This caplike body 24, which is preferably but not necessarily made of metal material, has an at least in part curved shape so as to define an internal surface which is also generally curved and which, in the mounted condition, faces the inlet 22a of the conduit 22 and the outlets 21b and 22b of the conduits 21 and 23.

In the example illustrated, the manifold member further comprises a plate element, made of metal material, as may be seen, for example in FIGS. 5 and 8-11, where it is designated by 25. The plate element has a generally flat central part, defined in which are three through holes (see FIGS. 8 and 9), and a peripheral edge, configured for being coupled in a fluid-tight way to the caplike body 24. Fluid-tight coupling between the caplike body 24 and the edge of the plate 25, when they are both made of metal, can for example be performed by welding. For the purposes of assembly, the ends of the conduits 21-23 are inserted in the aforesaid holes and then secured in a fluid-tight way to the plate 25, in particular by welding, as may be seen for example in FIG. 11.

In one embodiment, the inlet end of the conduit 22 and the outlet end of the conduits 21 and 23, to be secured to the plate 25, are cut with an inclined cut, as may be seen in FIG. 11. This characteristic enables improvement of the fluid-dynamic characteristics of the manifold member, reducing the head losses; a similar function is obtained by virtue of the curvature of the internal surface of the cap like body 24. Obviously, the through openings made in the plate 25 have a cross section consistent with that determined by the inclined cut of the conduits.

In a preferred embodiment, the exchanger unit 20 includes at least one first end plate, designated by 26, as may be seen, for example, in FIGS. 4, 5, 8, 9 and 12. In the assembled condition of the heat exchanger 1, this plate 26 faces the wall 3 of the casing 2, in contact therewith. The plate 26 can be obtained, for example, via shearing and drawing from sheet metal, and has a respective central passage, designated by 27 in FIGS. 8, 9 and 12, for connection with the passage 11 of the wall 3. In order to connect the two passages 11 and 27, at least one of them is defined by a generally tubular portion of the wall 3 or of the plate 26: in the example represented, said generally tubular portion belongs to the plate 26 and is designated by 26a in FIGS. 4 and 5. On the other hand, as has been said, also the internal edge of the wall 3 that defines the opening 11 is slightly drawn inwards, as may be seen in FIGS. 4 and 5). In the assembled condition, the top edge of the tubular portion 26a of the plate 26 is secured in a fluid-tight way, by welding, to the wall 3, and in particular to its internal edge delimiting the opening 11.

As may be noted, the plate 26 also has a generally annular flange portion 26b (FIGS. 4 and 5), rising from which is the tubular part 26a, wherein on this flange portion 26b the end turns of the conduits 21-23 rest.

In the assembled condition, the annular portion 26b of the plate 26 is set at a distance from the wall 3 of the casing in such a way that defined between the wall and the plate is a generally annular gap. The presence of this gap, as may be seen, for example, in FIGS. 4 and 5, where it is designated by 28, enables the temperature of the wall 3 to be contained even in the absence of insulating masses. The reason for this is that the plate 26 is joined to the wall 11 only at the top edge of the tubular portion 26a and that the end turns of the conduits are not directly in contact with the wall 11. It will moreover be appreciated that, during operation of the heat exchanger 1, the fumes that, through the interstices between the turns of the conduits 21-23, can reach the outside of the unit 20, and hence the gap 28, are substantially dry and have already yielded the majority of the heat to the conduits, thereby enabling a corresponding cooling in to be obtained the area of interface between the wall 3 and the plate 26.

As has been said, in the assembled condition, the end turns of the conduits 21-23 are in contact with the plate 26. Advantageously, the plate 26 is shaped so as to define seats or depressions, some of which are visible in FIG. 12, designated by 29, for positioning said end turns of the helices formed by the conduits 21-23. In the example, these seats 29 have a prevalent part shaped substantially like the arc of a circumference and a terminal part that is substantially rectilinear, which develops in an approximately tangential direction. The seats 29 contribute to ensuring proper positioning of the aforesaid end turns, and hence of the corresponding helices; the aforesaid tangential stretches of the seats 29 enable positioning of respective rectilinear portions of the conduits as far as outside the helix formed by the conduit 23 (see FIGS. 10-12) to be ensured, at the end of said portions of conduit there being provided the manifold member 24-25 described previously.

In the preferred embodiment of the invention, the unit 20 also comprises a second end plate, designated by 30 in FIGS. 4, 5, 8, 9 and 13, built in a way substantially similar to the plate 26, but preferably without central opening. In the assembled condition, the plate 30 faces the wall 4 of the casing 2 and is set at a distance therefrom. Resting on the plate 30 are the turns of the ends of the helices opposite to the wall 3. Also the plate 30 is provided with corresponding positioning seats 31, as may be seen, for example in FIG. 13, which have a configuration and functions that are similar to those of the seats 29 of the plate 26. Also in this case, the tangential stretches of the seats 31 enable positioning of respective rectilinear portions of the conduits as far as outside the helix formed by the conduit 23 to be ensured, at the end of said portions there being provided the intermediate angled bends 21c, 22c and 23c (see, for example, FIGS. 7 and 13).

According to a characteristic of the invention, the exchanger unit 20 is supported by the end wall 3 of the casing 2, i.e. by the same wall at which the inlet and the outlet for the liquid that is to flow through the heat exchanger 1 are located.

Figure 8:
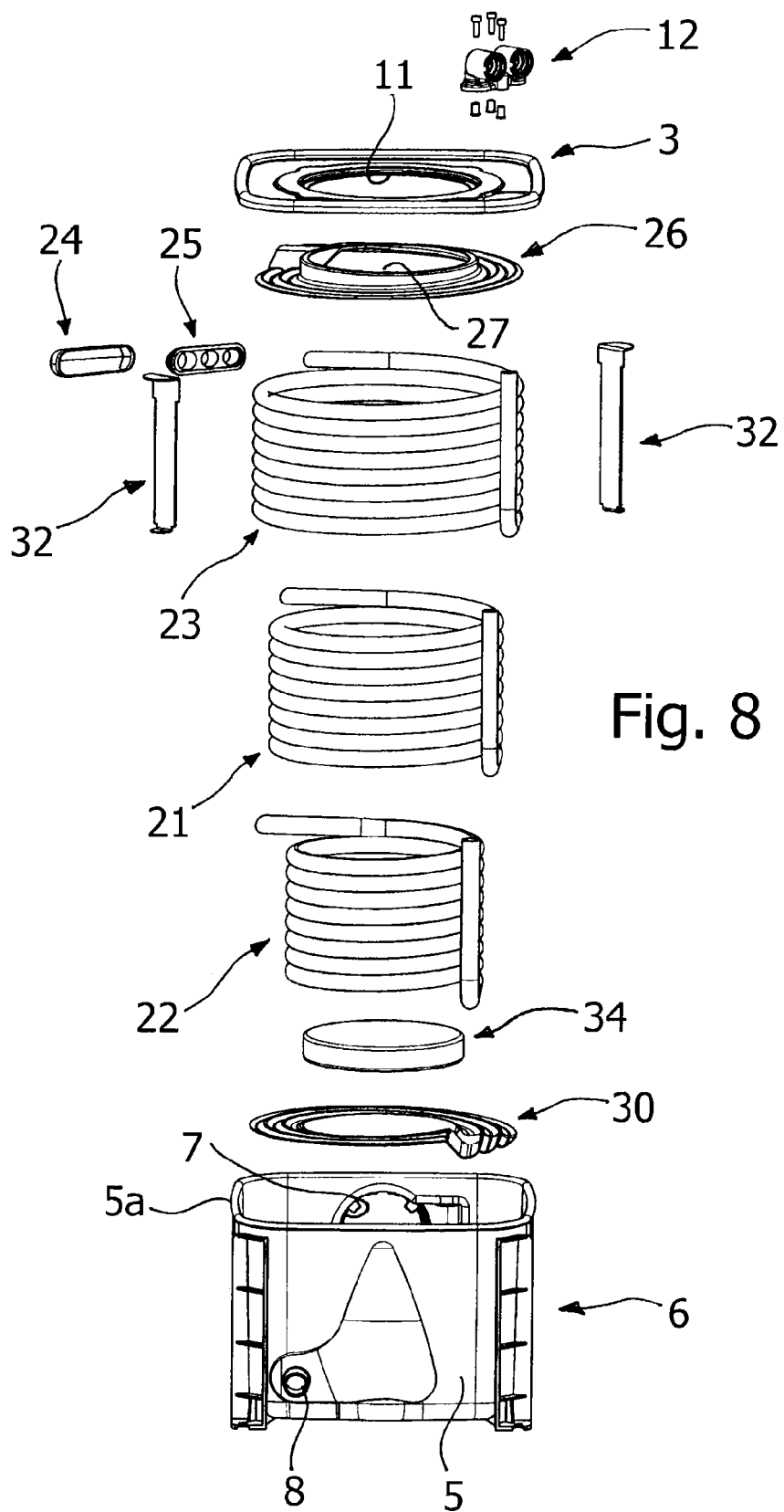

For this purpose, the unit 20 preferentially includes supporting elements in the form of ties, which are supported, at one end, by the wall 3 and which support the set of conduits 21-23 at the other end. In the non-limiting example illustrated, the aforesaid ties—only some of which are represented in FIGS. 8 and 9, where they are designated by 32—are supported indirectly by the wall 3 through the plate 26 and support the set of conduits 21-23 through the plate 30.

As has been mentioned previously, the helices formed by two adjacent conduits of the unit 20 are set at a distance from one another in such a way as to define between them a substantially cylindrical gap. Preferentially, the ties 32 extend in this interstice, substantially in the axial direction of the helices formed by the conduits 21-23. This solution makes it possible to contain the lateral encumbrance of the unit 20 and axially stabilize the set of helices.

The ties 32 are preferentially formed from sheet metal and have a generally flattened configuration. For coupling with the ties, the plates 26 and 30 have respective slits, not visible in the figures. The ties 32 initially have a substantially rectilinear configuration and, for the purposes of assembly, are mounted so that they pass through the aforesaid slits of the plates 26 and 30. The ends of the ties 32 projecting from the plates 26 and 30 towards the walls 3 and 4, respectively, are bent substantially at right angles, as may be clearly seen, for example, in FIGS. 12 and 13. Fixing is preferentially completed by welding said bent ends of the ties 32 to the corresponding plate 26 or 30.

Figure 14:
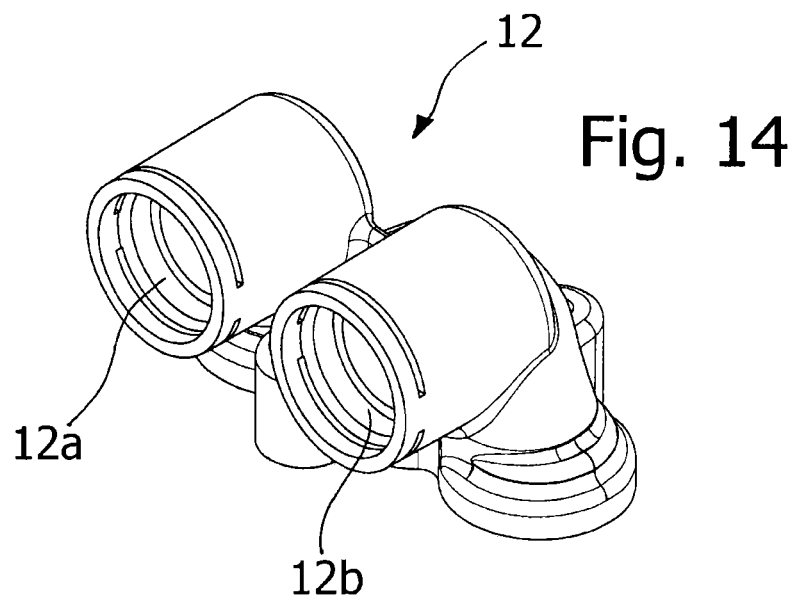
FIGS. 14 and 15 are two perspective views of a hydraulic connecting member of the heat exchanger of FIGS. 1 and 2.
Figure 15:
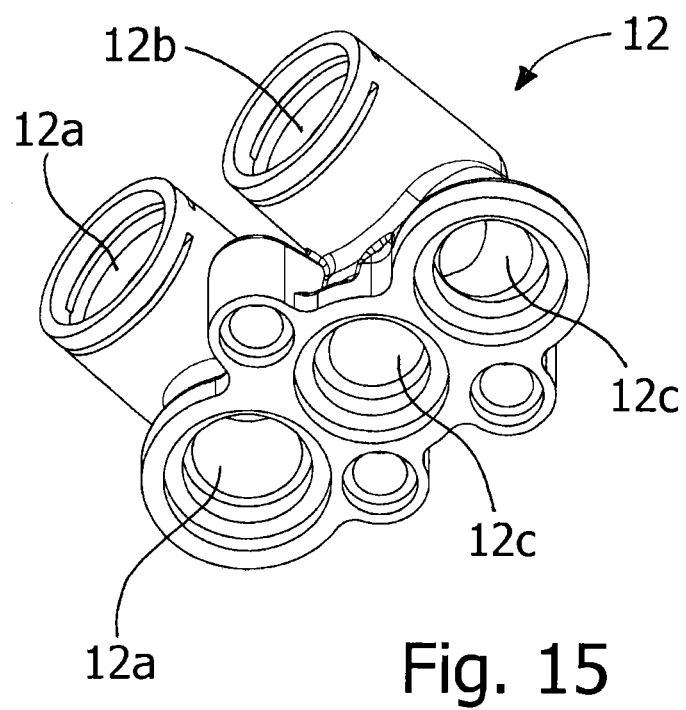

FIGS. 14 and 15 illustrate the connecting member 12, which is secured on the outside of the wall 3, in a position corresponding to the area 3a in which the ends of the conduits 21-23 to be connected towards the outside are located. The member 12 has a metal or plastic body, which defines two conduits 12a and 12b. The conduit 12a is to be connected to the outlet 22b of the conduit 22, and has a flow section substantially the same as that of the latter; the conduit 12b has an inlet, with a flow section that is substantially the same as that of the conduit 12a, which then branches off into two outlets 12c, which have a flow section substantially the same as those of the conduits 21 and 23, said outlets 12c being set at the connection with the inlets 21a and 23a of said conduits.

Production of the components of the heat exchanger 1 is simple. As has been said, the body 6 of the casing can be obtained by means of moulding of thermoplastic material, such as polypropylene. The wall 3, the plates 26 and 30, and the ties 32 can be obtained starting from sheet metal, via operations of shearing and/or deformation, using techniques consolidated in the sector. Also the metal conduits 21-23 can be obtained in the configurations described using techniques in themselves known in the sector. Likewise simple is the production of the components 24, 25 of the manifold member and of the body of the connecting member 12.

Also assembly of the heat exchanger 1 is very simple and can be at least partially automated.

A first end of the ties 32 is passed through the corresponding slits of the plate 26, with subsequent bending at an angle and welding to the plate itself. The helices formed by the three conduits 21-23 are arranged coaxially on the plate 26, in a way consistent with the shape of the seats 29 (FIG. 12) and in such a way that the ties 32 extend in one or more of the gaps defined between adjacent helices. Between the turns of a first end of the helices and the plate 26 a sealant material can be set, for example a silicone material resistant to high temperatures.

Figure 13:
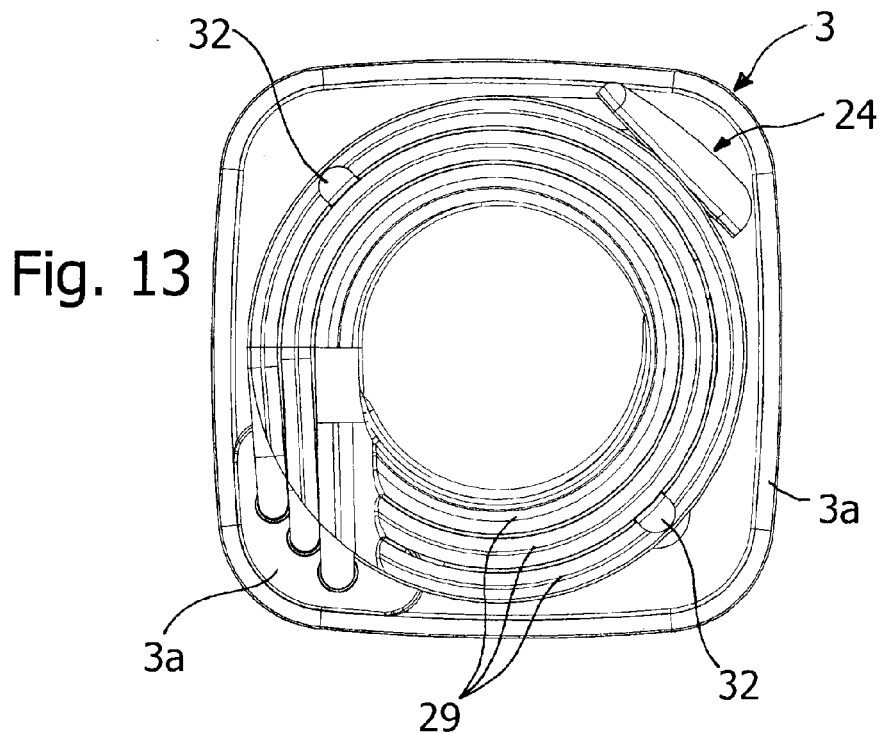

Next, the second ends of the ties 32 are fitted in the corresponding slits of the plate 30, which is brought into contact with the turns of the second end of the helices, in a way consistent with the shape of the seats 31 (FIG. 13). Preferentially, before positioning and fixing of the plate 30, an insulating body, designated by 34 in FIGS. 4-5 and 8-9, for example made of ceramic fibre or vermiculite, is inserted with interference fit in the bottom opening of the helix formed by the conduit 22. The second ends of the ties 32 are then bent and welded to the plate 30. Also in this case, a sealant of the type described above can be set between the turns of the second end of the helices, the insulating body 34, and the plate 30.

In this way, the conduits 21-23 are packed between the plates 26 and 30. As has been said, the seats 29 and 32 of the plates 26 and 30, in combination with the ties 32, guarantee proper positioning of the helices. It should be noted, in this regard, that the plates 26 and 30 are shaped also to guarantee an alignment between the turns of the various helices in a direction substantially orthogonal to the axis of the helices themselves: for said purpose, the areas of the plates 26 and 30 in which the seats 29 and 31 are defined develop at least in part as a coil, which starts and ends at a small inclined wall (as may be seen partially in FIGS. 8 and 9).

The unit 20 is completed with the distributor member 24-25, by first setting the plate 25 in the area of the corresponding ends of the conduits 21-23, as described previously (FIGS. 10-11), and then making the corresponding weld. The cap like body 24 is then associated in a fluid-tight way to the plate 25, also in this case—for example—by welding.

With the unit 20 thus assembled, the ends of the stretches of conduit 21d-23d project in height beyond the helices, as may be seen for example in FIGS. 10 and 11. These ends of the conduits 21-23 are then inserted in respective holes provided in the area 3a (see FIG. 7) so as to project slightly beyond the wall 3. On the wall 3, in a position corresponding to said ends of the conduits and to the area 3b, the connecting member 12 is then fixed for example with screws or the like, and with interposition of seal rings, so that the bifurcated conduit 12b-12c (FIGS. 14-15) is in communication with the inlets 21a and 23a of the conduits 21 and 23, and the conduit 12a is in communication with the outlet 22b of the conduit 22. Finally, the edge of the tubular portion 26a of the plate 26 is welded along the flared internal edge of the opening 11 of the wall 3.

The unit thus obtained can then be inserted towards the inside of the body 6, until the peripheral edge of the wall 3 rests on the edge of the part 5. The edge of the wall 3 can be directly calked on the edge of the part 5 (the figures illustrate the coupling before the calking operation). For said purpose, the edge of the part 5 of the plastic body 6 preferentially has a peripheral flange projecting outwards, designated by 5a in FIGS. 4-7, whilst the wall 3 is shaped so as to present a peripheral seat 3b, within which the aforesaid flange 5a is inserted. The outer edge of the wall 3, in a position corresponding to said seat 3b, can then be calked on the flange 5a, without the need for interposition of any seal element.

Figure 16:
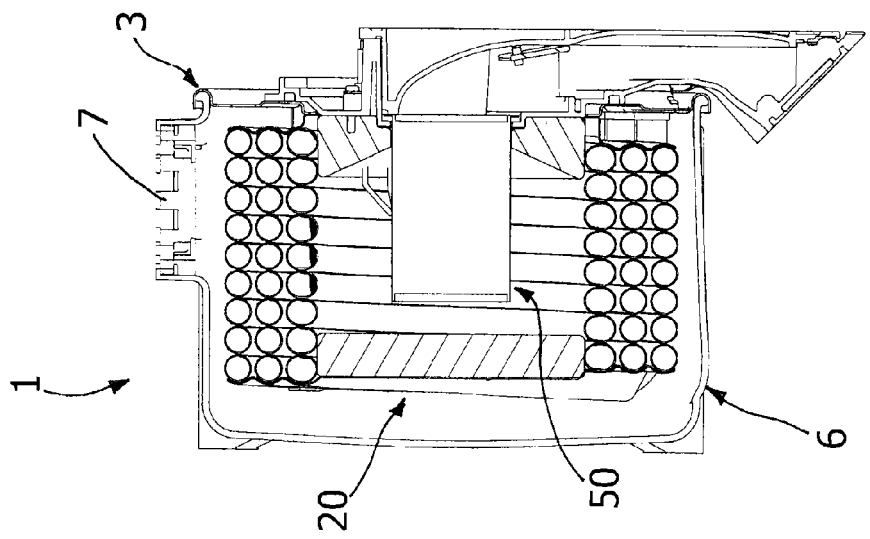
FIG. 16 is a front elevation of a heat exchanger according to FIGS. 1 and 2, moreover provided with a corresponding burner.
Figure 17:
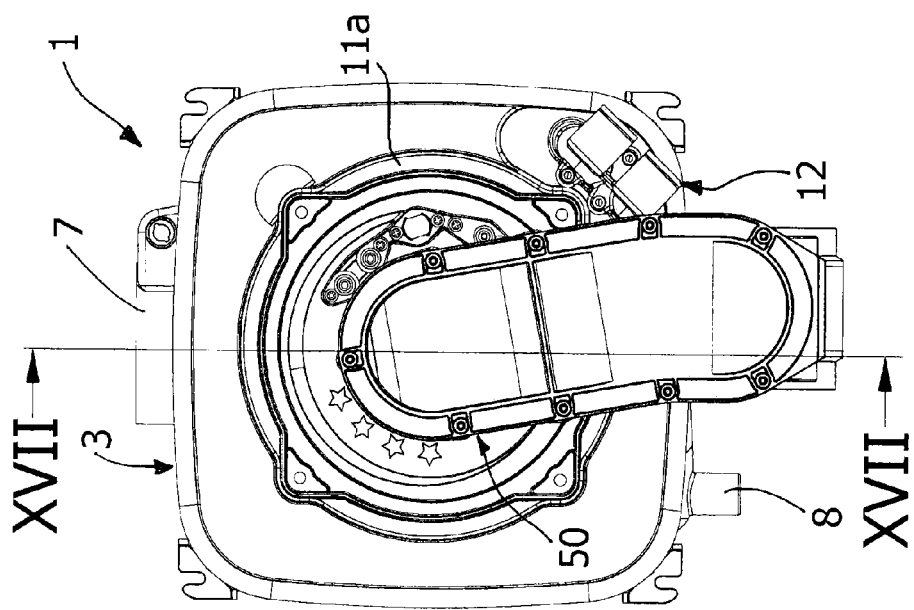
FIG. 17 is a cross section according to the line XVII-XVII of FIG. 16.

Operation of the heat exchanger 1 will now be briefly described with reference to FIGS. 16 and 17, assuming that the heat exchanger itself is to equip a gas boiler of a domestic type. In an application of this sort the first heat-exchange fluid is a heating liquid that must be made to circulate, for example, in a system of radiators, or else water of a sanitary system, and the second heat-exchange fluid is the fumes produced by combustion.

The liquid to be heated coming from the system enters the heat exchanger 1 via the conduit 12b of the connecting member 12. Via the bifurcation of the conduit 12b, the liquid feeds in parallel the conduits 21 and 23, until the manifold member 24-25 is reached. Via the manifold member, the water leaving the conduits 21 and 23 is conveyed into the conduit 22. The liquid then flows through the conduit 22, i.e., the helix that is closest to the burner 50, to reach the conduit 12a of the connecting member 12.

As a result of the two different sections of passage, and hence of the different flow rates, the liquid passes in an amount proportional to the heat-exchange capacity of the respective conduit, the three conduits 21-23 operating at independent and decreasing temperatures, starting from the internal conduit 22, which is the hottest, towards the outermost conduit 23, which is the coldest, thus favouring in a determining way the phenomenon of condensation of the fumes. In each conduit the liquid tends to absorb a different amount of heat: the majority of the heat is absorbed by the innermost conduit 22, which absorbs also the heat by irradiation generated by the burner 50, whilst the intermediate conduit 21 and the outermost conduit 23 absorb the residual energies of the fumes. As a result of the lower temperature of the conduits 21 and 23 it is possible to absorb a very high amount of energy from the fumes, which by being progressively impoverished and encountering liquid that is increasingly colder can condense effectively.

The liquid leaving the conduit 12a of the connecting member 12 is then re-introduced into the system. The condensates that are generated within the heat exchanger 1 are collected and evacuated via the outlet 8, and the residual fumes are expelled via the outlet 7.

The heat exchanger 1 can be made entirely of highly recyclable materials, with the minimum amount of fibre insulators or the like, via simple operations of deformation and shearing of sheet metal, as well as moulding of plastic material (when the body 6 is made of said material). The assembly of the components is likewise simple.

The structure of the heat exchanger is extremely compact, at the same time guaranteeing a high thermal efficiency with adequate flow of fluid. These advantages are increased in the case wherein two external coiled conduits are used, which, in parallel, feed a single internal coiled conduit. The solution proposed affords a wide flexibility in relation to the choice of the materials to be used for producing the unit 20, in view of an optimization of the cost-to-benefit ratio. For example, the external conduits can be made of a material of a lower value as compared to the internal conduit and/or with a material resistant to corrosion and less resistant to heat as compared to the material used for the internal conduit (as has been said, the external conduits are less subject to heat and more subject to condensation). Likewise, the thickness of the conduits can be different, for example with the external conduits thinner than the internal conduit.

The fact that the exchanger unit is substantially "self-supporting", i.e., entirely supported by a single wall of the casing, enables use of one and the same casing body to obtain heat exchangers for different thermal powers, and hence distinguished by different axial dimensions of the coils. For example, all the other conditions remaining the same, the constructional elements described previously—with helices of the conduits 21-23 having nine turns—enable a heat exchanger to be obtained having indicatively a power of 32 kW: the same elements, but with conduits 21-23 that define helices of just six turns, enable instead a 20-kW heat exchanger to be obtained, and so forth according to the number of turns chosen. This being said, exchanger units 20 with helices having different numbers of turns can in any case be combined to a casing 2 of the same type, with evident advantages in terms of manufacturing. These advantages are evidently increased thanks to the solution of envisaging a constant pitch P for the various helices, and hence an equal axial dimension for the various helices.

The fact that the exchanger unit is supported by a single wall of the casing also presents the advantage of enabling a reduction of the insulators. This advantage is further increased thanks to the presence of the annular gap 28, which enables heating of the wall 3 to be contained, with the advantages that derive therefrom.

The support of the exchanger unit by a single end wall of the casing then determines the practical advantage of enabling testing of the unit 20 before it is inserted into the casing 2, unlike exchangers according to the prior art. Possible manufacturing defects may hence be corrected in a simpler and faster way.

The aforesaid advantages are also correlated to the fact that the inlet and the outlet of the fluid are located at the same end wall that supports the exchanger unit. Said characteristic renders even more flexible installation of the heat exchanger, in view of the final applications. It will be appreciated, for example, that with a simple angular rotation of the wall 3 with respect to the part 5, the entire unit 20—and hence the connecting member—can assume alternative positions, in particular with respect to the fume outlet 7 and to the condensate outlet 9. This aspect proves useful, as has been said, because it enables modification of the position of the connector 12 according to the final application on boilers of various types.

Of course, without prejudice to the principle of the invention, the details of construction and the embodiments may vary widely with respect to what has been described and illustrated herein purely by way of example, without thereby departing from the scope of the present invention.

In the embodiment exemplified previously, the axis of the heat exchanger 1 is horizontal, but this is not to be considered in any way binding or limiting. Likewise, the invention must not be understood as being limited to applications of a domestic type, on products such as boilers, water heaters, and the like, the heat exchanger according to the invention being in fact usable also in other contexts.

In the example illustrated, the inlet and outlet of the heat exchanger are set close to one another on the wall 3, but said type of positioning is not to be understood as limiting. It is in fact evident that, by shaping the conduits 21-23 appropriately, the inlet and the outlet could occupy positions that are even set apart from one another, for example with the inlet in the proximity of a first corner of the wall 3 and the outlet in the proximity of a second corner of the same wall, for example the corner diagonally opposite to the first corner.

The confluence of the outlets 21b, 23b of the conduits 23 into a single outlet conduit—in a way similar to what has been described with reference to the conduit 12b-12c of the member 12—could possibly be obtained within the casing 2, by envisaging for the purpose a suitable header with two inlets and one outlet.

The body 6 could be made of metal material, for example, steel, instead of plastic.

The invention claimed is:

1. A heat exchanger, having:
   an exchanger inlet and an exchanger outlet for a fluid,
   an exchanger unit including a plurality of coiled conduits substantially coaxial to each other for the fluid, comprising at least one first and one second conduit, the first and the second conduit having coils of different diameter, such that the second conduit forms a helix extending within a helix formed by the first conduit, and
   a casing defining a chamber for housing the exchanger unit, the casing having a first end wall, a second end wall and a peripheral part between the two end walls, the chamber being adapted to receive a heat exchange medium for heat exchange with the fluid, the first end wall having a through opening defining a mouth of said chamber,
   wherein each conduit of the plurality has an inlet and an outlet, the outlet of the first conduit being connected in series with the inlet of the second conduit, such that the fluid exiting the outlet of the first conduit enters the inlet of the second conduit,
   wherein the heat exchanger comprises a supporting arrangement for the exchanger unit the supporting arrangement being supported by the first end wall of the casing, such that the exchanger unit is supported by the first end wall of the casing via the supporting arrangement, and
   wherein the inlet of the first conduit and the outlet of the second conduit are at the first end wall of the casing, the exchanger inlet and the exchanger outlet being both at the first end wall of the casing.

2. The heat exchanger according to claim 1, wherein the plurality of coiled conduits comprises one third conduit for the fluid, substantially coaxial to the first and the second conduit, the third conduit having coils with diameter greater than the diameter of the coils of the first conduit, such that the third conduit forms a helix within which the helix formed by the first conduit extends,
   the inlet of the third conduit is at the first end wall of the casing and the outlet of the third conduit is connected to the inlet of the second conduit in parallel with the outlet of the first conduit, such that the fluid exiting the outlet of the third conduit enters the inlet of the second conduit together with the fluid exiting the outlet of the first conduit.

3. The heat exchanger according to claim 1, wherein each conduit of the plurality comprise a tube coiled to form the helix of the respective conduit, wherein the tube has an intermediate angled bend for defining a respective initial stretch of conduit or a final stretch of conduit, respectively, that extends in a generally axial direction of the corresponding helix.

4. The heat exchanger according to claim 3, wherein said stretches of conduit are substantially rectilinear, are substantially parallel to each other and relative to the axis of the helix formed by the respective conduit, and extend outside the helix formed by the outermost conduit of the plurality.

5. The heat exchanger according to claim 1, wherein the helices formed by two adjacent conduits of the plurality are spaced from each other, such that an annular interstice is defined between said two adjacent conduits.

6. The heat exchanger according to claim 5, wherein the supporting arrangement comprises a plurality of tie elements extending in one said annular interstice, substantially in an axial direction of the helices formed by the conduits of the plurality.

7. The heat exchanger according to claim 1, wherein
   the supporting arrangement includes one first end plate, facing the first end wall of the casing and having a respective through opening connected to the through opening of the first end wall of the casing and substantially coaxial thereto, at least one of said through openings being defined by a tubular portion of the first end wall or the first end plate, the first end plate being secured to the first end wall,
   the coils at a first end of the helices formed by the conduits of the plurality are in contact with the first end plate, and
   at least one annular portion of the first end plate is spaced apart from the first end wall of the casing, such that between the first end wall and the said annular portion of the first end plate an annular interstice is defined, the annular interstice being in fluid communication with a gap extending between the helix formed by the outermost conduit of the plurality and the peripheral part of the casing.

8. The heat exchanger according to claim 7, wherein the supporting arrangement includes one second end plate, facing the second end wall of the casing, spaced therefrom, and the coils at a second end of the helices formed by the conduits of the plurality are in contact with the second end plate.

9. The heat exchanger according to claim 1, wherein the supporting arrangement comprises at least one of a first end plate facing the first end wall of the casing and a second end plate facing the second end wall of the casing, and wherein said at least one of the first end plate and the second end plate is shaped to define positioning depressions for the coils of a respective end of the helices formed by the conduits of the plurality.

10. The heat exchanger according to claim 8, wherein
the supporting arrangement comprises a plurality of tie elements; and
the tie elements have opposed ends secured to the first and the second end plate, respectively.

11. The heat exchanger according to claim 2, wherein each conduit of the plurality comprise a tube having an inlet and an outlet, the tube being coiled to form the helix of the respective conduit, and wherein the heat exchanger also comprises a connector member defining the exchanger inlet and the exchanger outlet, the connector member being mounted on the first end wall of the casing and defining a first and a second passage, the first passage being connected to the outlet of the tube of the second conduit and the second passage having an inlet and two outlets, said two outlets being connected to the inlets of the tubes of the first and the third conduits, respectively.

12. The heat exchanger according to claim 1, also comprising a manifold member mounted at an inlet end of the second conduit and an outlet end of the first conduit, the manifold member being arranged for connecting the outlet of the first conduit in series with the inlet of the second conduit.

13. The heat exchanger according to claim 1, wherein the second end wall and the peripheral part of the casing are formed in a single piece of plastic or synthetic material.

14. A heat exchanger having:
an exchanger inlet and an exchanger outlet for a fluid,
an exchanger unit including a plurality of coiled conduits substantially coaxial to each other for the fluid, comprising at least one first, one second and third conduit, the first, the second and the third conduit having coils of different diameter, such that the second conduit forms a helix extending within a helix formed by the first conduit and the third conduit forms a helix within which the helix formed by the first conduit extends,
a casing defining a chamber for housing the exchanger unit, the casing having a first end wall, a second end wall and a peripheral part between the two end walls, the chamber being adapted to receive a heat exchange medium for heat exchange with the fluid, the first end wall having a through opening defining a mouth of said chamber,
wherein each conduit of the plurality has an inlet and an outlet, the outlet of the first conduit being connected in series with the inlet of the second conduit, such that the fluid exiting the outlet of the first conduit enters the inlet of the second conduit,
wherein the outlet of the third conduit is connected to the inlet of the second conduit in parallel with the outlet of the first conduit, such that the fluid exiting the outlet of the third conduit enters the inlet of the second conduit together with the fluid exiting the outlet of the first conduit.

15. The heat exchanger according to claim 14, wherein
the heat exchanger comprises a supporting arrangement for the exchanger unit, the supporting arrangement being supported by the first end wall of the casing, such that the exchanger unit is supported by the first end wall of the casing via the supporting arrangement; and
the inlet of the first conduit, the inlet of the third conduit and the outlet of the second conduit are at the first end wall of the casing, the exchanger inlet and the exchanger outlet being both at the first end wall of the casing.

16. The heat exchanger according to claim 14, wherein each conduit of the plurality comprise a tube having an inlet and an outlet, the tube being coiled to form the helix of the respective conduit, and the heat exchanger also comprises a connector member defining the exchanger inlet and the exchanger outlet, the connector member being mounted on the first end wall of the casing and defining a first and a second passage, the first passage being connected to the outlet of the tube of the second conduit and the second passage having an inlet and two outlets, said two outlets being connected to the inlets of the tubes of the first and the third conduits, respectively.

17. The heat exchanger according to claim 14, also comprising a manifold member mounted at an inlet end of the second conduit, an outlet end of the first conduit and an outlet end of the third conduit, the manifold member being arranged for connecting the outlet of the third conduit to the inlet of the second conduit in parallel with the outlet of the first conduit.

18. The heat exchanger according to claim 1, wherein a burner is mounted at said through opening of the first end wall of the casing.

19. The heat exchanger according to claim 1,
wherein the exchanger unit and the supporting arrangement form an assembly which is hung from the first end wall of the casing, in such a way that an end of said assembly opposite to said first end wall is set at a distance from the second end wall of the casing to define an end gap therebetween,
and wherein said end gap is in fluid communication with an annular gap comprised between the peripheral part of the casing and the helix formed by the outermost conduit of the plurality.

20. The heat exchanger according to claim 1, wherein each conduit of the plurality comprise a tube, which is coiled to form the helix of the respective conduit, and a corresponding passage defined by a connector member mounted on the first end wall of the casing, an end of the tube being connected in fluid communication with the corresponding passage.

* * * * *